(12) United States Patent
Holcomb

(10) Patent No.: US 7,088,463 B2
(45) Date of Patent: Aug. 8, 2006

(54) BINARY DATA TRANSMISSION OVER AN IMAGE DATA CHANNEL

(75) Inventor: David Marshall Holcomb, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 894 days.

(21) Appl. No.: 09/982,142

(22) Filed: Oct. 18, 2001

(65) Prior Publication Data

US 2003/0076542 A1  Apr. 24, 2003

(51) Int. Cl.
*H04N 1/32* (2006.01)

(52) U.S. Cl. .............................. 358/1.15; 358/426.02; 358/426.12; 382/232

(58) Field of Classification Search ........... 358/426.02, 358/426.04, 426.05, 426.06, 426.08, 426.09, 358/426.12, 470, 1.15; 382/232, 233
See application file for complete search history.

(56) References Cited

U.S. PATENT DOCUMENTS

| | | | |
|---|---|---|---|
| 4,776,013 A * | 10/1988 | Kafri et al. .................. | 380/54 |
| 5,107,332 A | 4/1992 | Chan | |
| 5,185,673 A | 2/1993 | Sobol | |
| 5,295,181 A | 3/1994 | Kuo | |

FOREIGN PATENT DOCUMENTS

| JP | 11115257 | 4/1999 |
|---|---|---|
| JP | 11170675 | 6/1999 |
| WO | WO 97/32262 | 9/1997 |

OTHER PUBLICATIONS

Pavlidis et al. "Information Encoding with Two-Dimensional Bar Codes", IEEE Computer, Online, vol.25, No. 6, Jun. 1992.
Search Report for European Patent Application No. EP02257210. Search completed Jun. 17, 2005.

* cited by examiner

*Primary Examiner*—Thomas D. Lee

(57) ABSTRACT

A method of sending binary data over an image data channel. The binary data is encoded into an encoded linear matrix image, and the encoded linear matrix image is transmitted over the image data channel. The received linear matrix image is decoded to recover the binary data. The encoding uses encoding parameters which are adapted for encoding the binary data into an encoded matrix image. The encoding parameters are defined in such a manner that a transformed matrix image produced by transmitting the encoded linear matrix image over the image-transforming channel is reconstructable into the encoded linear matrix image. The binary data is encoded into the encoded linear matrix image according to the encoding parameters. In order to recover the binary data from the received matrix image, the decoding analyzes a header section of the received linear matrix image to determine image-distortion characteristics of the image data channel. The header section is decoded according to the image-distortion characteristics so as to recover the encoding parameters that were used to encode the binary data. A data section of the received linear matrix image is decoded according to the encoding parameters so as to form recovered binary data.

42 Claims, 13 Drawing Sheets

BINARY DATA TRANSMISSION OVER AN IMAGE DATA CHANNEL

BACKGROUND OF THE INVENTION

Electronic devices capable of displaying or producing a hard copy of text and images, such as inkjet and other types of printers, typically include a data channel over which the device is able to receive electronic data representing the text and images. Data received over this data channel is generally assumed to represent information to be displayed or printed.

However, in some situations, it is desirable to receive binary data for purposes other than display or printing. Many electronic devices of this sort contain memory for storing firmware instructions which are executed by a processor to perform the printing and display functions of the device. It would be advantageous if binary data representing new firmware instructions were able to be sent to the device over the existing data channel and programmed into the memory so as to replace some or all of the old firmware instructions, rather than requiring that the memory itself be physically removed from the electronic device and replaced, or that the device incur the cost and complexity of providing a separate channel for receiving new firmware instructions. It would also be advantageous to transmit other types of non-text, non-image binary data over the existing data channel. For example, advertisements or coupons that are to be stored in the electronic device for future periodic display or printing could be transmitted.

Also, in many systems the data channel through which the text and images are transmitted to the electronic device distorts or transforms the images in some manner as an integral part of the transmission process. For example, web browsers and print drivers in a computer or a set-top box such as a WebTV unit often perform such transformations when sending text and images to printers. Usually these distortions or transformations do not perceptibly degrade the quality of the displayed or printed text and images, and serve to speed up or otherwise improve display or printing performance. However, if binary data such as firmware instructions are transmitted over the print data channel instead, these transformations would almost certainly ruin the data, since a change in even one byte of transmitted firmware might prevent the electronic device from working properly, or from even working at all.

Accordingly, it would be highly desirable to have a new and improved system and method that can reliably send binary data over an image data channel.

SUMMARY OF THE INVENTION

In a preferred embodiment, the present invention provides a method of sending binary data over an image data channel. The binary data is encoded into an encoded linear matrix image, and the encoded linear matrix image is transmitted over the image data channel. The received linear matrix image is decoded to recover the binary data.

An alternate embodiment of the present invention includes a method of encoding binary data for transmission over an image data channel. The method defines encoding parameters which are adapted for encoding the binary data into an encoded matrix image. The attributes are defined in such a manner that a transformed matrix image produced by transmitting the encoded linear matrix image over the image-transforming channel is reconstructable into the encoded linear matrix image. Then the binary data is encoded into the encoded linear matrix image according to the encoding parameters.

Another embodiment of the present invention includes a method of recovering binary data encoded in an encoded matrix image from a received matrix image. The method analyzes a header section of the received linear matrix image to determine image-distortion characteristics of the image data channel. The header section is decoded according to the image-distortion characteristics so as to recover the encoding parameters that were used to encode the binary data. A data section of the received linear matrix image is decoded according to the encoding parameters so as to form recovered binary data.

BRIEF DESCRIPTION OF THE DRAWINGS

The above-mentioned features of the present invention and the manner of attaining them, and the invention itself, will be best understood by reference to the following detailed description of a preferred embodiment of the invention, taken in conjunction with the accompanying drawings, wherein.

DESCRIPTION OF THE PREFERRED EMBODIMENT

Figure 1:
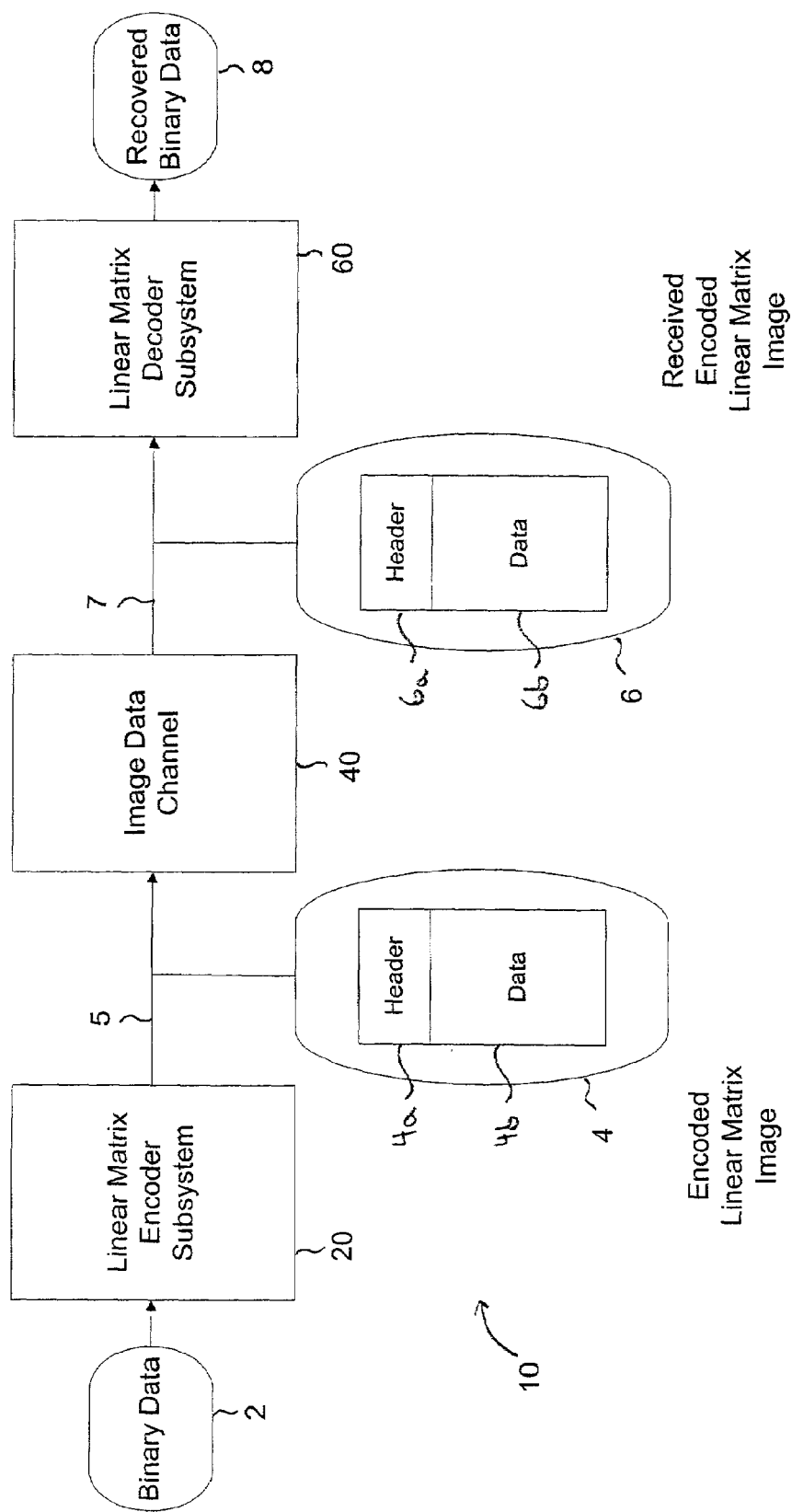
FIG. 1 is a block diagram of an embodiment of a system according to the present invention for sending and receiving binary data over an image data channel.

Referring now to the drawings, there is illustrated a system and method constructed in accordance with the present invention for sending binary data over an image data channel. The binary data is first encoded into a linear matrix image, and then the encoded linear matrix image is transmitted over the image data channel. After receipt, the received linear matrix image is decoded to recover the binary data.

As best understood with reference to FIG. 1, a preferred embodiment of the system 10 includes a linear matrix encoder subsystem 20 which encodes binary data 2 into an encoded linear matrix image 4. The binary data 2 is encoded into an encoded data section 4b of the encoded linear matrix image 4. The matrix image 4 also includes an encoded header section 4a which has an image pattern which identifies the matrix image 4, and has parameters for decoding the encoded data section 4b. The encoded linear matrix image 4 is communicated via path 5 to an image data channel 40 for transmission, and the received linear matrix image 6 is communicated to a linear matrix decoder subsystem 60 via path 7. As will be discussed subsequently in greater detail, the received linear matrix image 6 may be identical to the encoded linear matrix image 4, but more typically is transformed or distorted in some manner by the operation of image data channel 40. The linear matrix decoder subsystem 60 identifies the received linear matrix image 6 based on the image pattern in its received header section 6a, and decodes the received data section 6b using the parameters in the received header section 6a so as to form recovered binary data 8.

Figure 2:
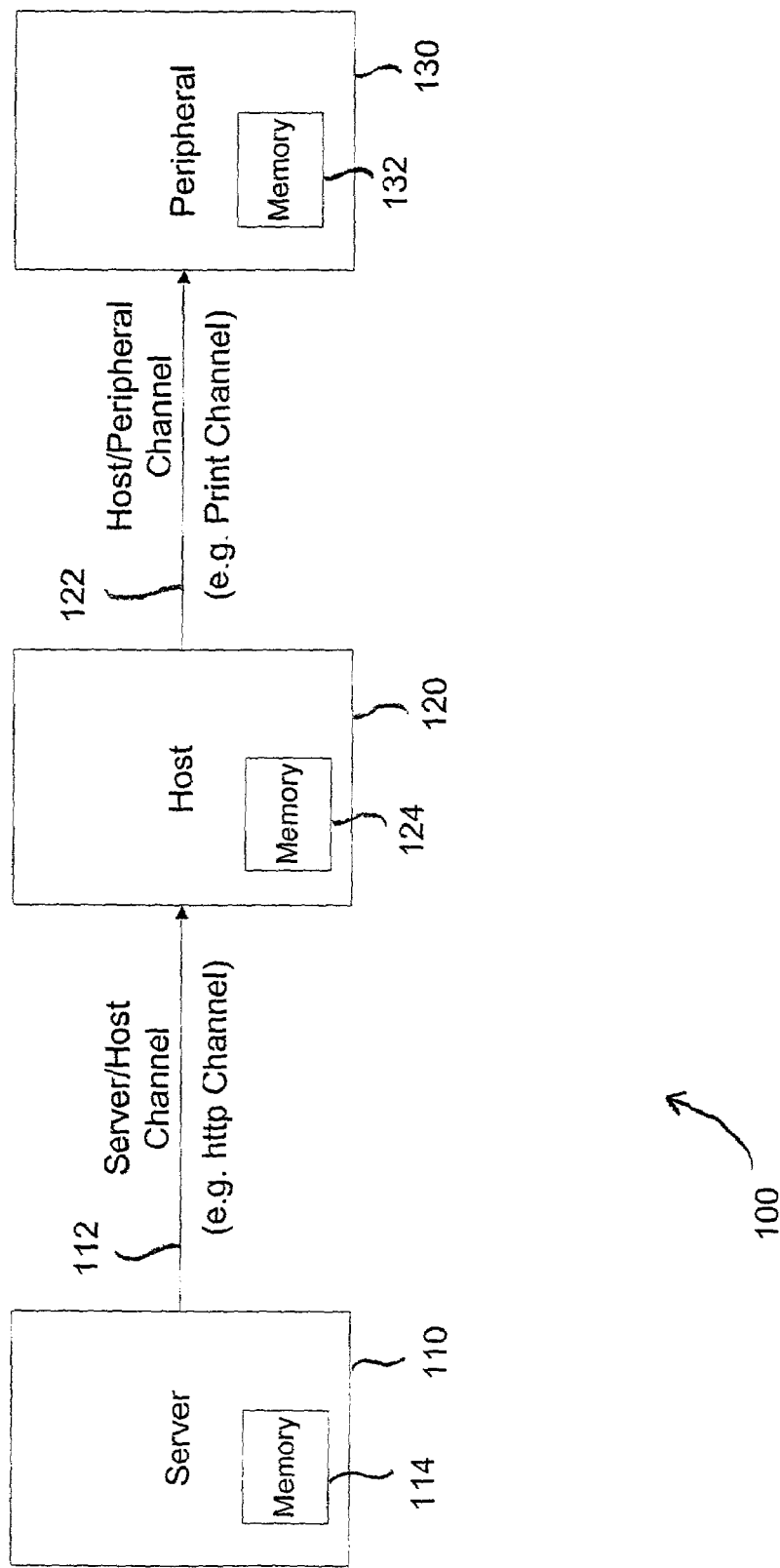
FIG. 2 is a block diagram showing a partitioning of the system of FIG. 1 among a server, a host, and a peripheral.

In discussing the present invention in further detail, it is useful to consider, with reference to FIG. 2, a computer system 100 embodying the present invention. The computer system 100 includes a server apparatus 110 which is communicatively coupled via server-to-host channel 112 to a host apparatus 120 (which may also be referred to as client apparatus 120). Host apparatus 120 is further communicatively coupled via host-to-peripheral channel 122 to a peripheral apparatus 130. A preferred embodiment of peripheral apparatus 130 is a printer; in such an embodiment, host-to-peripheral channel 122 is a print channel over which text and images to be printed can be sent to the printer. A preferred embodiment of server 110 provides requested web pages to the host 120. As will be discussed subsequently, certain web pages may be linked to the binary data 2 or to the encoded linear matrix image 4. A preferred embodiment of host 120 includes a transforming image data channel. As will also be discussed subsequently, this data channel typically has a web browser which renders the text and images of the web page, including the encoded linear matrix image 4, and a print driver which forms a printer control language (PCL) representation of the web page text and images, including the transformed linear matrix image 6. A preferred embodiment of peripheral 130 includes the linear matrix decoder subsystem 60 which detects the transformed linear matrix image 6, compensates for the transformations done by the image data channel 40, and recovers the recovered binary data 8.

One preferred embodiment of the binary data 2 is an upgrade to the computer-readable instructions stored in a memory device 132 that are executed by a processor (not shown) in peripheral 130 in order to perform the functions of peripheral 130. Another embodiment of the binary data 2 is an advertisement or a discount coupon that are to be stored for periodic or future use in the memory 132. For example, in the case of a printer, the binary data may represent information for a coupon that offers a percentage discount when presented for an ink purchase, and an instruction to the printer to print out a copy of that coupon after every 200 pages are printed.

In the preferred embodiment of computer system 100, memory 132, along with memory 114 of server 110 and memory 124 of host 120, contain computer-executable instructions that are performed by one or more processors (not shown) in order to implement modules of system 100 and steps of the method of the present invention.

Figure 3:
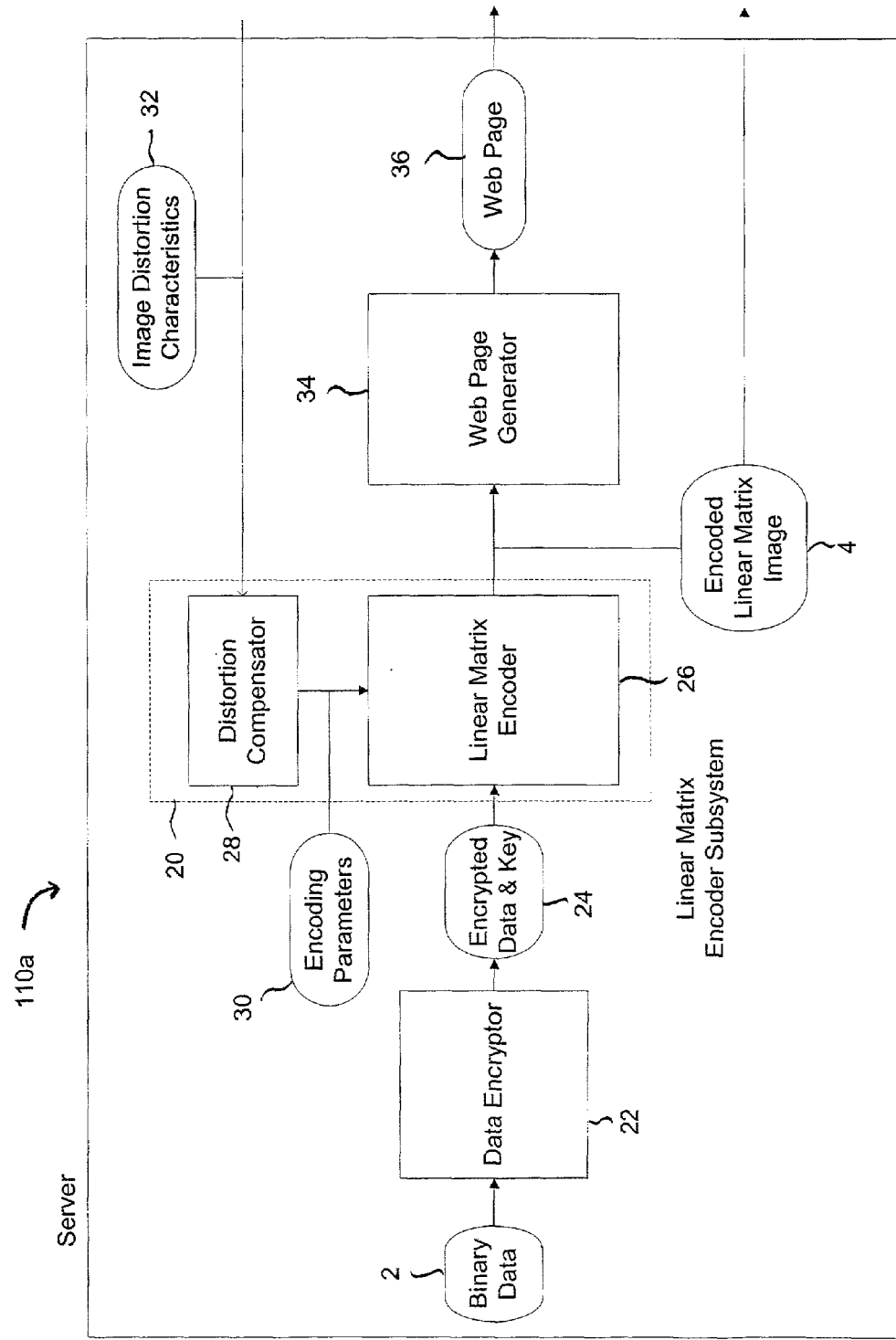
FIG. 3 is a schematic representation of a first embodiment of a server usable with the system of FIG. 2.

Considering now in further detail a preferred embodiment of the server 110, and with reference to FIG. 3, a server 110a may optionally include a data encryptor 22 which encrypts the binary data. Encrypting the binary data can protect data such as proprietary firmware algorithms for the printer, or valuable coupons. Encrypting may also be used to prevent unauthorized use of the binary data transmission methods, such as the transmission of unauthorized coupons or advertisements in place of the authorized ones. In other embodiments, encryption may provide data redundancy so that error detection and correction (EDC) can be done by the printer to ensure that the recovered binary data 8 is identical to the original binary data 2. The encrypted data 24, including the encryption key, are provided to a linear matrix encoder module 26 of the linear matrix encoded subsystem 20; however, if encryption is not performed, then the binary data 2 is provided to the linear matrix encoder module 26 of the linear matrix encoded subsystem 20 instead.

A distortion compensator module 28 of the linear matrix encoder subsystem 20 provides a set of encoding parameters 30 to the linear matrix encoder module 26. The encoding parameters 30 are adapted for encoding the binary data 2 in such a manner that the transformed matrix image 6 is reconstructable into the encoded linear matrix image 4 by the linear matrix decoder subsystem 60. The encoding parameters 30 will be described subsequently in greater detail, as will the usage of these encoding parameters 30 by the decoder subsystem 60. In some embodiments, image-distortion characteristics 32 for the image data channel 40 may be provided to the distortion compensator 28 by the image data channel 40, and analyzed to determine encoding parameters 30 that are tuned to the particular channel 40. In other embodiments where the image-distortion characteristics 32 are not known to the distortion compensator 28, the distortion compensator 28 will generate worst-case encoding parameters 30 that will allow reconstruction of recovered binary data 8 from transformed matrix images 6 produced by a wide variety of image data channels 40.

The linear matrix encoder module 26 encodes the binary data 2 into the encoded linear matrix image 4 according to the encoding parameters 30. Preferably the encoded linear matrix image 4 is stored as an image file maintained in a memory 114 of the server 110a. The image file may be in a variety of file formats known in the art, including but not limited to JPG, GIF, TIF, and BMP formats.

A web page generator 34 generates code for a web page 36 that is linked to or associated with the encoded linear matrix image 4. The code for the web page 36 may be HTML, XML, or the like. The linkage is preferably implemented by specifying in the code for the web page 36 the file path for the file containing the encoded linear matrix image 4. For example, in HTML the "IMG SRC" keyword could be used to specify the file path. The web page generator 34 could be a manual process that constructs a static web page 36, such as a "Firmware Upgrade" web page for the peripheral 130 that a user of the host 120 would browse to. Alternatively, the web page generator 34 could be a module which dynamically builds a web page 36 tailored to a specific peripheral 130 by having the host 120 query the printer to determine whether or not the peripheral is running the current version of its firmware.

Figure 4:
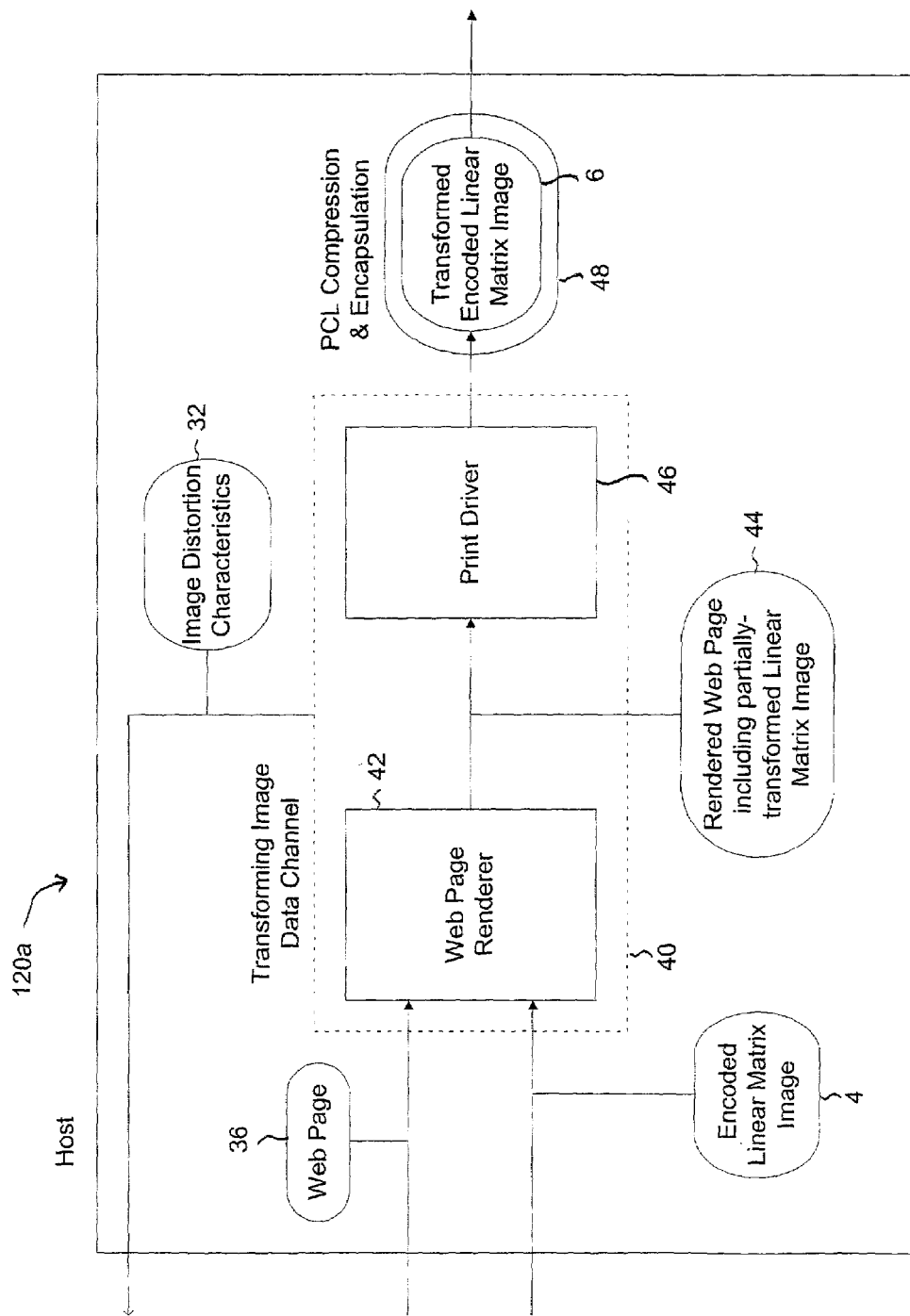
FIG. 4 is a schematic representation of a first embodiment of a host usable with the system of FIG. 2.

Considering now in further detail a first embodiment of the host 120, and as best understood with reference to FIG. 4, the encoded linear matrix image 4 and the web page 36 are provided to a web page renderer 42 of the image data channel 40 of a host 120a coupled to the server 110a. The web page renderer 42 is typically part of a web browser, such as Netscape Navigator or Microsoft Internet Explorer, and processes the web page code in order to form an image of the web page that is suitable for sending to the peripheral 130. In the preferred embodiment where the peripheral 130 is a printer, the rendered 42 would typically be activated by the operator of the host 120 selecting a "print" operation.

In rendering an image file, such as the encoded linear matrix image 4, that is associated with the web page 36, the renderer 42 may perform a variety of transformations of the image 4. The image 4 may be scaled in the X or Y directions; for example, a 100 by 100 pixel block in the image 4 may be rendered on the printer as a 50 by 75 pixel block. Certain colors present in the image 4 may be mapped to somewhat different colors of the printer, in order to reduce the total number of colors that need to be rendered or to match the color-producing capabilities of the printer. In order to speed up data transfers between the host 120 and the printer—particularly with a slow host 120 such as a Web TV console—the image 4 may be downsampled to send only a portion of the image 4, such as every other pixel, to the printer. Alternatively, the image 4 may be compressed in a lossy way prior to transmission to the printer. If the image 4 is too large to fit on a single page, it may be clipped, or transformed into a multi-page image by pagination in the X and/or Y directions. Margins may be added on all sides of each page. Different ones of these transformations can be done by different browsers, while other browsers don't perform any transformations at all.

The result of the abovementioned transformations performed by the renderer 42 is to form a rendered web page which includes a partially-transformed linear matrix image 44 which is in turn provided to a print driver 46. The print driver 46, which is also activated as a result of the operator selecting the "print" operation, may perform additional transformations. The print driver 46 may smooth the image to further speed up the data transfers, which typically results in a further reduction in the number of different colors in the transformed matrix image 6. The print driver 46 then divides the transformed matrix image 6 into swaths, compressing each swath and forming an encapsulated transformed matrix image 48 according to a printer-control language (PCL) protocol known to those in the art.

Figure 5:
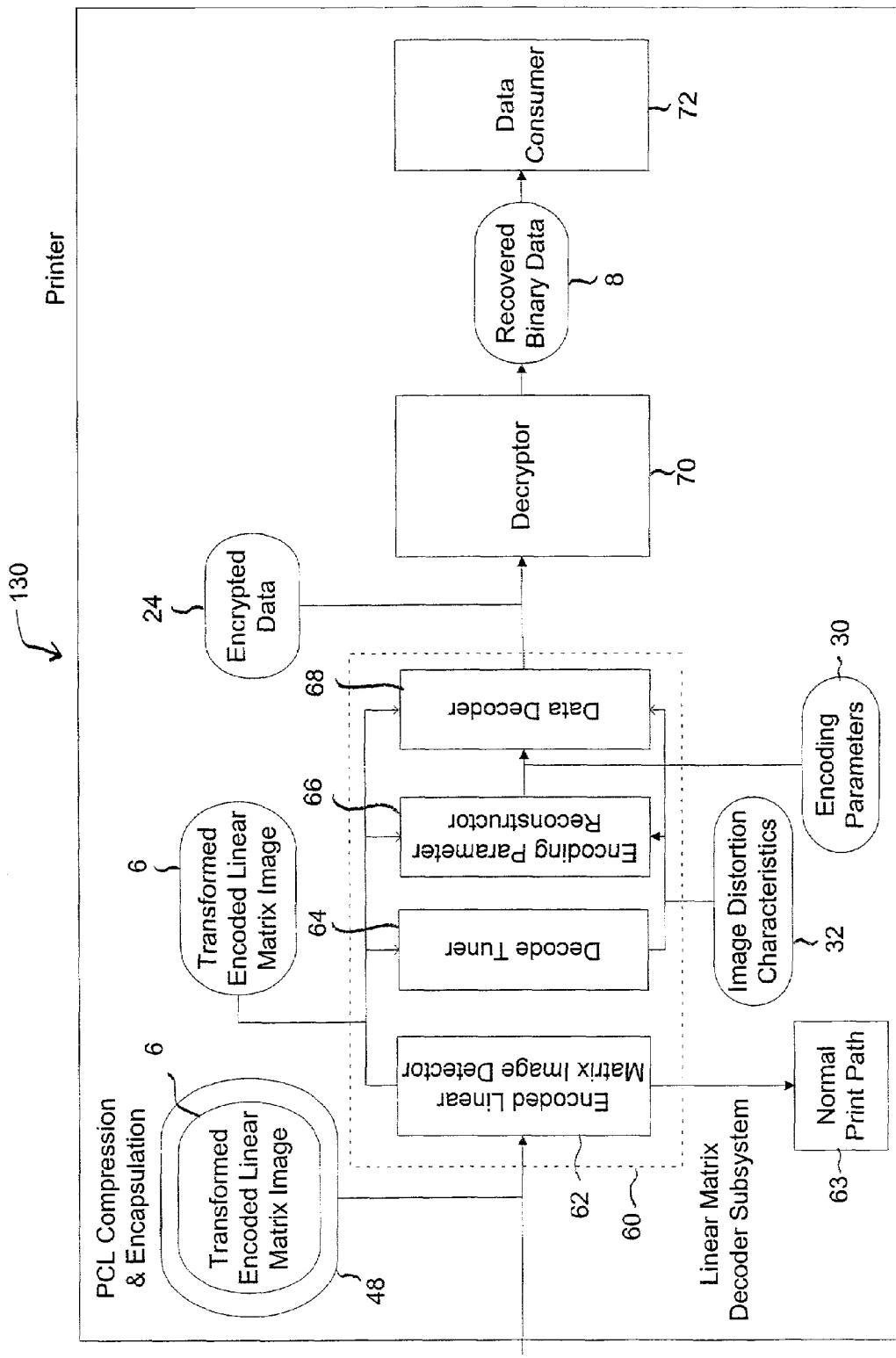
FIG. 5 is a schematic representation of a printer usable as the peripheral of the system of FIG. 2.

Considering now in further detail a preferred embodiment of the printer 130, and as best understood with reference to FIG. 5, the encapsulated transformed matrix image 48 is transmitted over the host-peripheral channel 122 and received by the linear matrix decoder subsystem 60 of the printer 130. An encoded linear matrix image detector module 62 removes the PCL encapsulation from the received data, and checks the encapsulated data to determine if the data represents a transformed linear matrix image 6. This determination, as will be discussed subsequently in greater detail, is preferably done by looking for a specific pattern in a header section of the transformed matrix image 6. If the received data is not part of the transformed linear matrix image 6, the detector 62 sends the data to a normal print path processor 63 for printing on the printer 130a. However, if the detector 62 identifies the received data as a transformed linear matrix image 6, and if the matrix image 6 represents binary data consumable by the printer 130a as will also be discussed subsequently, then the transformed linear matrix image 6 is sent to subsequent processing modules 64,66,68 of the decoder subsystem 60.

A decode tuner module 64 analyzes the header section 6a of the transformed linear matrix image 6 to determine image-distortion characteristics 32 of the transforming image data channel 40. As discussed heretofore with regard to the image data channel 40, the image-distortion characteristics 32 may include dimensional (X and/or Y) scaling, color mapping, downsampling, clipping, pagination, margination, smoothing, compression, and printer control language encapsulation. The determination of the image-distortion characteristics 32 will be discussed subsequently in further detail.

An encoding parameter reconstructor module 66 decodes a portion of the header section 6a according to the image-distortion characteristics 32 so as to recover the encoding parameters 30 that were used to encode the binary data 2 into the encoded data section 4b, and which can now be used to decode the received transformed data section 6b. The recovery of the encoding parameters 30 will be discussed subsequently in further detail.

A data decoder module 68 decodes the received transformed data section 6b according to the encoding parameters 30 so as to recover the binary data. In some cases, the binary data may be encrypted, in which case the data decoder 68 forms binary data that is decrypted by a decryptor module 70 to form the recovered binary data 8. In other cases, the binary data is not encrypted, and so the data decoder 68 forms the recovered binary data 8 directly. The decoding operation will be discussed subsequently in further detail.

A data consumer 72 utilizes the recovered binary data 8. One preferred utilization of the recovered binary data 8 is as a firmware upgrade for the printer 130. In this case, the data consumer 72 installs the firmware upgrade in the printer 130. Another preferred utilization of the recovered binary data 8 is as an advertisement or a discount coupon. In this case, the data consumer 72 stores the advertisement or coupon, and tracks the usage and/or operating conditions of the printer 130 so as to determine when to print the advertisement or coupon.

Figure 6:
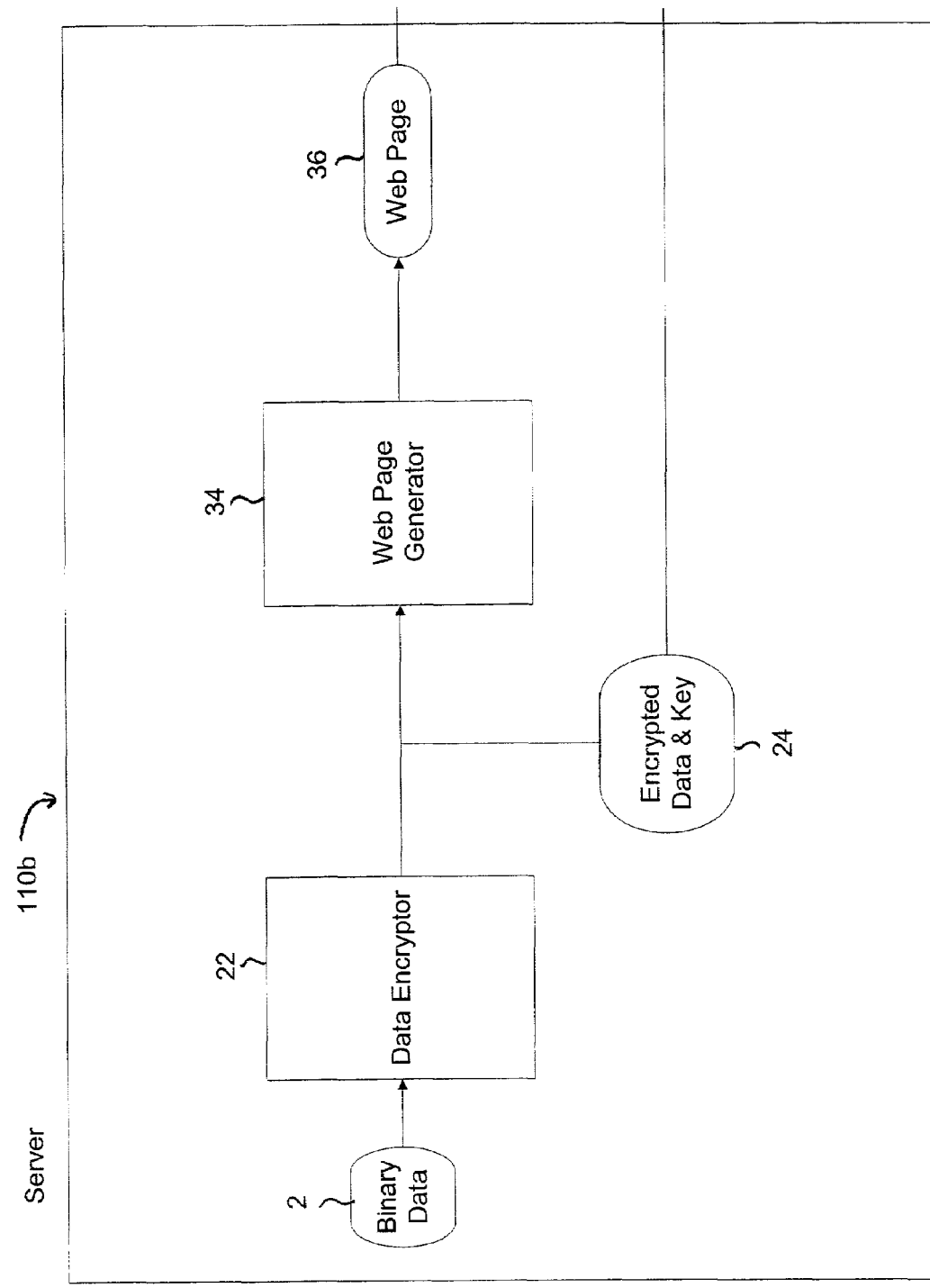
FIG. 6 is a schematic representation of a second embodiment of a server usable with the system of FIG. 2.
Figure 7:
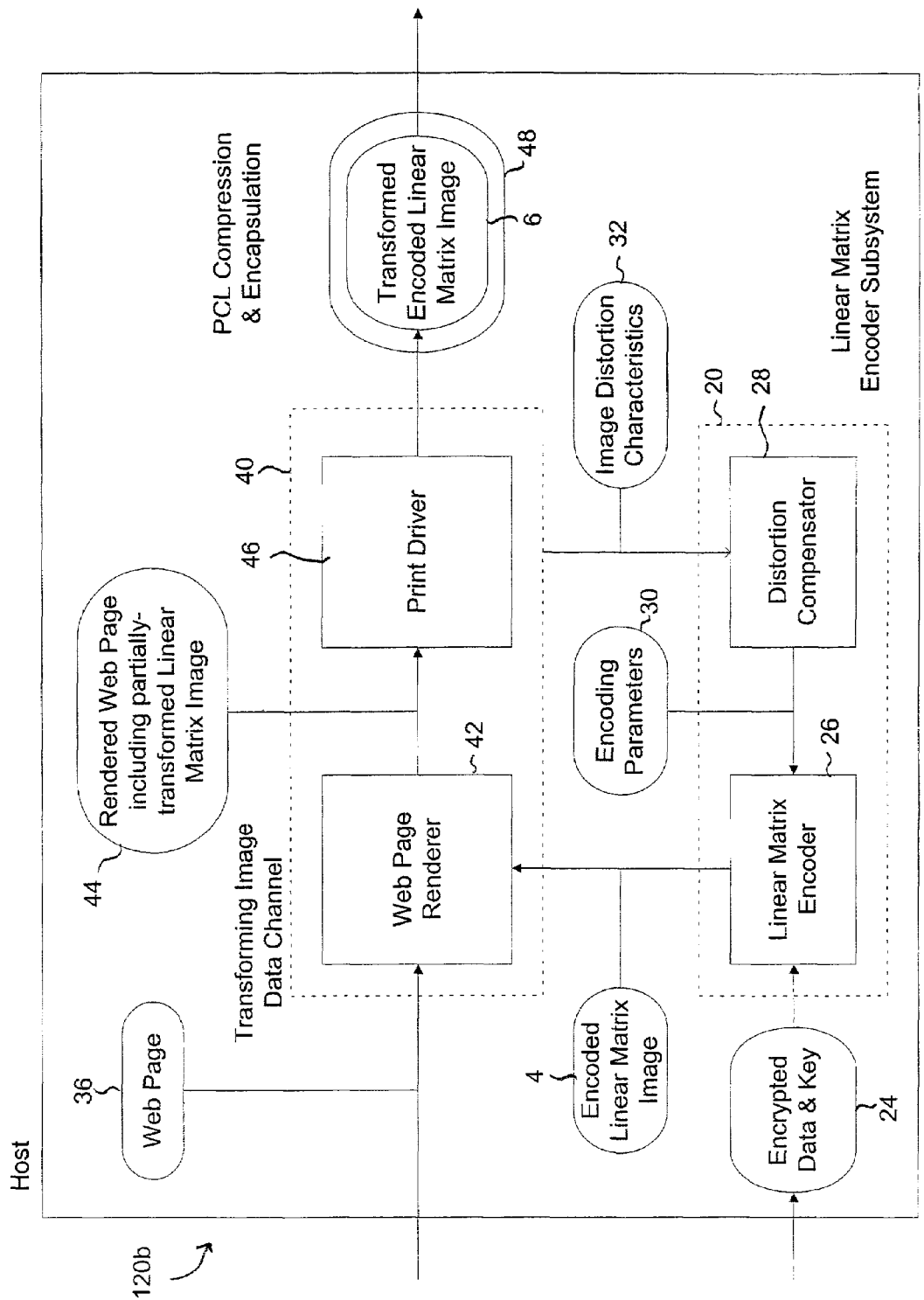
FIG. 7 is a schematic representation of a second embodiment of a host usable with the system of FIG. 2.

Considering now in further detail an alternate embodiment of the server 110 and host 120, and with reference to FIGS. 6 and 7 respectively, a server 110b is coupled to a host 120b. In the alternate embodiment, the linear matrix encoder subsystem 20 resides in the host 120 rather than in the server 110, and is preferably implemented as a set of browser-executable instructions in a language such as Java, Javascript, or the like. Consequently, the server 110b provides the encrypted data and key 24 to the host 120b (note that if the server 110b does not include optional data encryptor 22, then the binary data 2 is provided to the host 120b instead of the encrypted data and key 24). The host 120b then forms the encoded linear matrix image 4 from the data. Other modules and data of server 110b and host 120b generally are similar to those of server 110a and host 120a. Host 120b is coupled to, and sends encapsulated transformed matrix image 48 to, printer 130.

In the preferred embodiment, modules 22,26,28,34,42,46, 62,63,64,66,68,70,72 are implemented as computer-executable software or firmware instructions that execute corresponding portions of the flowcharts of FIGS. 10 through 13 that will be discussed subsequently. These steps are partitioned as appropriate among computer-readable media such as memories 114,124,132. Each memory 114,124,132 may be an electronic, magnetic, optical, or other physical device or means that can contain or store a computer program for use by, or in connection with, a computer-related system or method. A non-exhaustive list of more specific examples of the computer-readable media includes an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CD-ROM) (optical). Note that the computer-readable medium could even be paper or another suitable medium upon which the program is printed, as the program can be electronically captured, via for example optical scanning of the paper or other medium, and then compiled, interpreted, or otherwise processed in a suitable manner if necessary, and then stored in a computer memory.

In other embodiments, modules 22,26,28,34,42,46,62,63, 64,66,68,70,72 may be implemented in hardware with any one or a combination of the following technologies, each of which are well known in the art: a discrete logic circuit(s) having logic gates for implementing logic functions upon data signals, an application-specific integrated circuit (ASIC) having appropriate combinatorial logic gates, a programmable gate array(s) (PGA), a field programmable gate array (FPGA), and the like.

Figure 8:
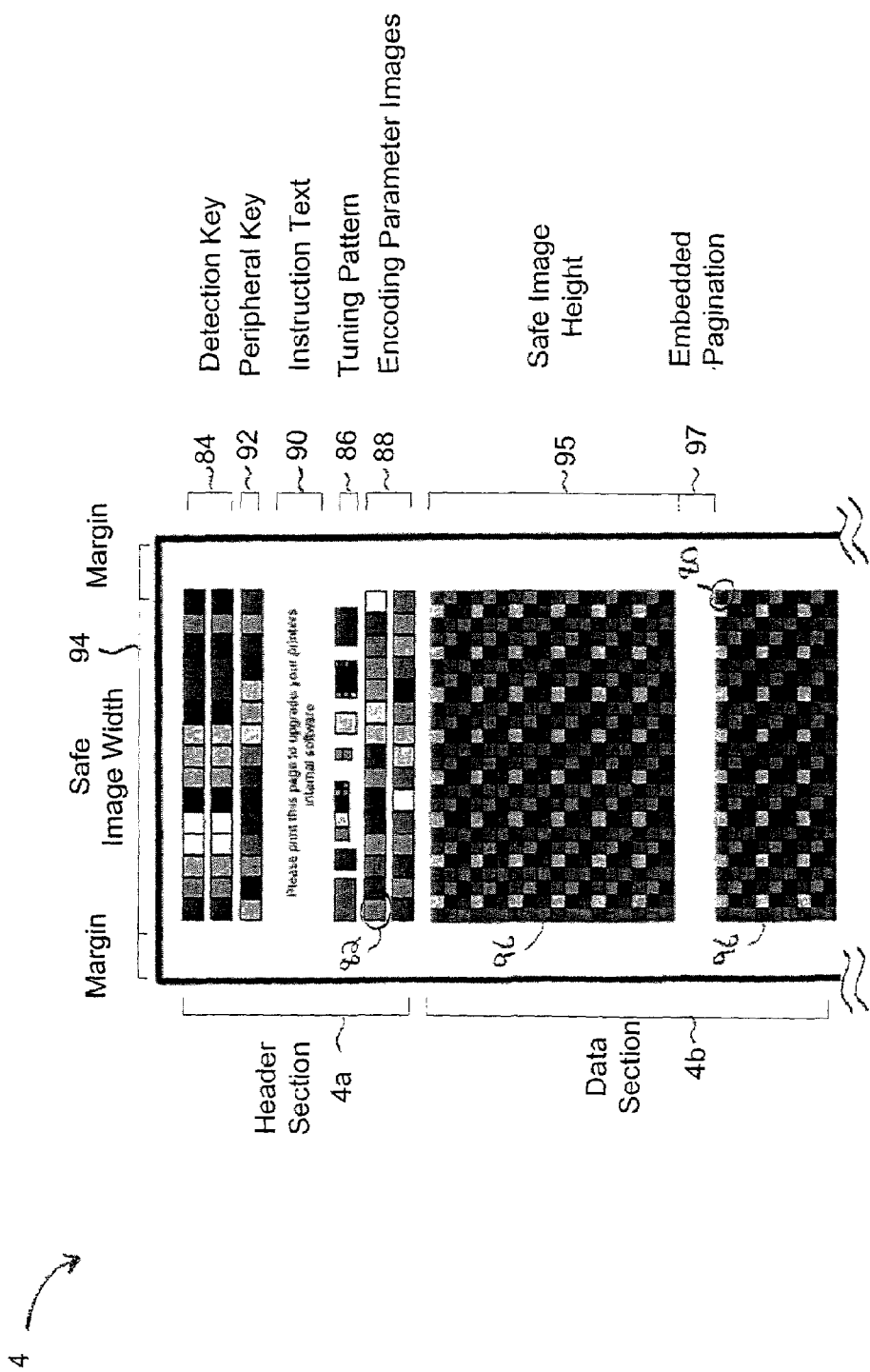
FIG. 8 is a schematic representation of an embodiment of an encoded linear matrix image usable with the system of FIG. 1.

Considering now in further detail the encoded linear matrix image 4, and with reference to an exemplary matrix image 4 illustrated in FIG. 8, the matrix image 4 includes a header section 4a and a data section 4b. The data section 4b has a plurality of colored data marking regions 80 which form the encoded representation of the binary data 2. Each of the data marking regions 80 has a predetermined size and one of a set of predetermined colors. Each region 80 is preferably rectangular, having a number of pixels in a horizontal X direction and a vertical Y direction, with all rectangular regions 80 preferably of the same size. The number of regions 80 in each horizontal row of the data section 4b is determined by a safe image width 94 of the encoded matrix image 4.

Each data marking region 80 is representative of a predetermined amount of the binary data 2. The amount of binary data 2 that each region 80 represents is preferably determined by the number of discrete colors in the color choice set used for a region 80. For example, if there are 18 individual colors in the color choice set, then 4 bits ($2^4$=16) of binary data 2 can be encoded, using 16 of the 18 colors. It will therefore be apparent that the more colors available in the color choice set, the more bits of binary data 2 can be encoded in a single region 80, and the fewer regions 80 needed to encode a given amount of binary data 2. In addition, the numeric value of the binary data 2 represented by a region 80 corresponds to the particular color of the region 80. How the binary data 2 is encoded to form the colored data marking regions 80 will be described subsequently in further detail.

The size of each region 80, and the set of possible color choices that each region can assume, are determined based on the image-distortion characteristics 32 of the image data channel 40 over which the encoded matrix image 4 is to be transmitted. The channel 40 typically produces spatial distortion (for example, changing the size in the X and/or Y direction of a region 80) and/or color distortion (for example, changing the color of all or part of a region 80). To compensate for these distortions, the size and set of color choices for regions 80 are chosen such that the transformed data section 6b of the transformed linear matrix image 6 can be decoded into recovered binary data 8 with a high degree of accuracy. For a given degree of accuracy, a data section 4b for a channel 40 that produces greater distortion will have regions 80 of larger size, fewer color choices, or both. Conversely, a data section 4b for a channel 40 that produces less distortion will have regions 80 of smaller size, more color choices, or both. For a higher degree of accuracy, the data section 4b will have regions 80 of larger size, fewer color choices, or both.

Where the image-distortion characteristics 32 of the intended channel 40 can be specifically determined, an optimal data section 4b for that channel 40 can be constructed. If the image-distortion characteristics 32 of the intended channel 40 cannot be specifically determined, a worst-case data section 4b that can be successfully decoded for a variety of different channels 40 is built.

Considering now the header section 4a of the encoded linear matrix image 4, the header section 4a preferably includes a plurality of colored header marking regions 82. Different subsets of regions 82 serve different purposes. One subset forms a detection key 84 for recognizing the transformed linear matrix image 6 within the stream of channel data transmitted over the image data channel 40, and for segregating the transformed linear matrix image 6 from the other channel data, such as data which is to be printed. The detection key 84 has a predetermined pattern, known to the linear matrix decoding subsystem 60, that is both easily detected and unlikely to occur in the other channel data. To ensure that the transformed matrix image 6 will be recognized, the pattern of the detection key 84 is preferably repeated at least once, and is preferably encoded using large region sizes and color sets having fewer color choices.

Another subset of colored header marking regions 82 forms a predetermined known tuning pattern 86 that is comparable to a transformed tuning pattern in the received linear matrix image 6 so as to define the image-distortion characteristics 32 of the channel 40. The tuning pattern 86 preferably has a set of header marking regions 82 of different sizes and colors. By comparing the size and color of regions in the transformed tuning pattern to those in the known tuning pattern 86, the image-distortion characteristics 32 can be determined. The image-distortion characteristics 32 are subsequently used to decode the encoding parameters in the header section 6a and the binary data in the data section 6b of the transformed matrix image 6.

An additional subset of colored header marking regions 82 forms a set of encoding parameter images 88 that represent the encoded versions of the encoding parameters 30 used to encode the binary data 2 into the data section 4b. Once the encoding parameters 30 are decoded from the transformed header section 6a, they can be used to decode the transformed data section 6b to recover the binary data. To ensure that the encoding parameters 30 will be accurately reconstructed from the transformed matrix image 6, the set of encoding parameter images 88 is preferably encoded using large region sizes and color sets having fewer color choices.

As another aid to ensure successful detection and decoding of the contents of the transformed header section 6a, regions of white space in the header 4a of the encoded linear matrix image 4 separate the detection key 84, the predetermined tuning pattern 86, and the encoding parameter images 88.

In some embodiments, the header section 4a also includes human-readable instruction text 90. The text 90 allows instructions to be provided to a user who views the encoded 4 or transformed matrix image 6. For example, when viewing the web page 36 linked to the encoded matrix image 4 with a web browser on the host 120, the text 90 could inform the user to print the web page to the printer 130 in order to upgrade his firmware.

Some embodiments of the header section 4a also includes a subset of colored header marking regions 82 that form a peripheral key 92. The peripheral key 92 has a pattern which indicates whether the data encoded in the encoded matrix 4 is appropriate for the peripheral 130. If the peripheral key 92 is not correct for the peripheral 130, the peripheral 130 will ignore the data.

Considering now in greater detail the encoding parameters 30, a preferred set of encoding parameters 30 are indicated in Table I. As described heretofore, the values of the encoding parameters 80 are preferably determined from the image-distortion characteristics 32 of the image data channel 40.

TABLE I

| Parameter | Definition |
| --- | --- |
| NumChannels | Number of color channels used to specify the color for a region 80 (eg. RGB encoding uses 3 channels, KCMY encoding uses 4 channels) |
| SafeWidth | The maximum safe image width 94 for an encoded matrix image 4 to avoid clipping in the X direction. Typically in pixels. |
| SafeHeight | The maximum safe image height 95 for an encoded matrix image 4 to avoid clipping in the Y direction. Typically in pixels. |
| MinX | The minimum size of a region in the horizontal X direction to ensure detection. Typically in pixels. |
| MinY | The minimum size of a region in the vertical Y direction to ensure detection. Typically in pixels. |
| MinColorVal | The minimum color value of a color channel |
| MaxColorVal | The maximum color value of a color channel |
| MinColorChg | The minimum change in a color channel required to ensure detection as a different color |

The size of each rectangular color data marking region 80 in the encoded data section 4b is MinX by MinY pixels. The number of discrete colors in the color choice set is determined according to the formula (any remainder is truncated):

Number of colors in set=(MaxColorVal−MinColorVal)/MinColorChg

It should be noted that alternate embodiments of the encoding parameters 30 may include separate Min-Color-Val, Max-Color-Val, and Min-Color-Chg parameters for each of the color channels.

Regions 80 are preferably arranged from left to right in each horizontal row. A new horizontal row positioned below the previous one is started when the maximum number of regions 80 in a row is reached. The maximum number of regions 80 that can be printed in a single horizontal row is determined by the formula (any remainder is truncated):

Number of regions in a row=SafeWidth/MinX

The maximum number of horizontal rows of regions 80 that can be arranged in a block 96 of the data section 4b is determined by the formula (any remainder is truncated):

Number of rows in a block=SafeHeight/MinY

Blocks 96 are separated from each other in the data section 4b by an embedded pagination white space 97 which ensures that clipping in the Y direction will be avoided.

Figure 9:
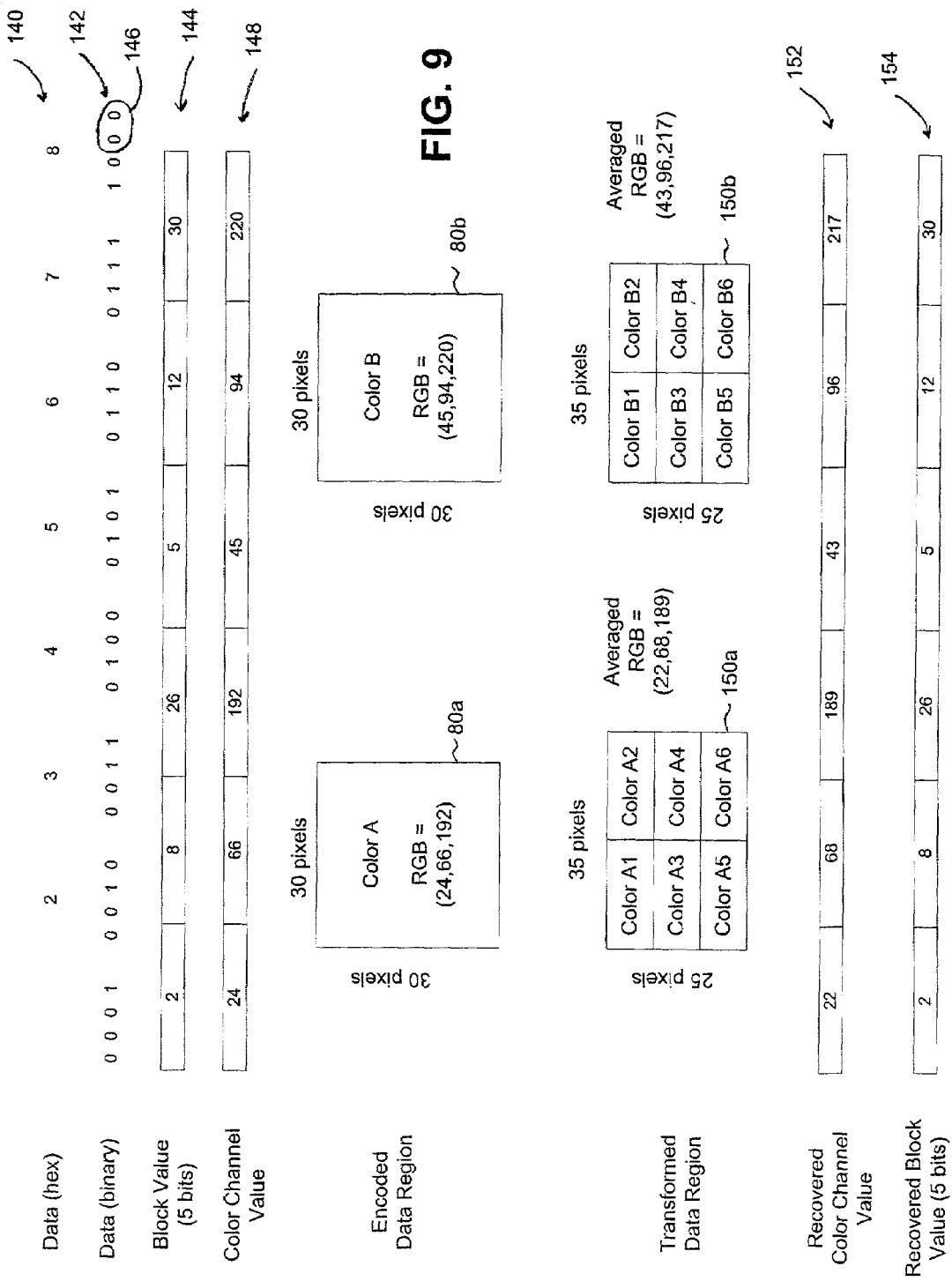
FIG. 9 is a schematic representation, using exemplary data, of the encoding and decoding operations, and the image transformations, of the system of FIG. 1.

Considering now the encoding of the binary data 2 to form the colored data marking regions 80, and with reference to the exemplary matrix image 4 of FIG. 8, the exemplary encoding example of FIG. 9, and the exemplary values in Table II of encoding parameters 30, assume that a hexadecimal data value 140 of "12345678" is to be encoded into a set of data regions 80. Each data region 80 is to have the minimum detectable size of 30 pixels in the horizontal X direction, and 30 pixels in the vertical Y direction.

TABLE II

| Parameter | Exemplary Value |
| --- | --- |
| NumChannels | 3 |
| MinX | 30 pixels |
| MinY | 30 pixels |
| MinColorVal | 10 |
| MaxColorVal | 255 |
| MinColorChg | 7 |

The number of discrete colors in the color choice set is (255−10)/7=32.8, which is truncated to 32. The number of bits of binary data that can be represented in a region 80 by 32 discrete colors is calculated $\log_2 32$, which (after truncation) is 5 bits. Therefore, the binary representation 142 of the hex data 140 is treated as a stream of data and segmented into six 5-bit blocks 144, each 5-bit block for encoding into a data region 80. (In this example, the two leftover bits 146 of the binary data 142 would be encoded as part of a further region which is not shown.)

The data value of each 5-bit block 144 is then converted into a corresponding one of a set of color channel values 148, according to the formula:

Color Channel Value=(Data Value*MinColorChg)+MinColorVal

Since NumChannels in this example is 3, representing an RGB color encoding scheme, three color channel values are grouped together to define the color of each region 80. Region 80a has an RGB color value of (24,66,192), and region 80 b has an RGB color value of (45,94,220).

The decoding of a received data section 6b produced by transmitting the exemplary regions 80a, 80b through the image data channel 40 to form corresponding received colored data marking regions 150a, 150b will now be considered in further detail. For purposes of illustration, assume that the image distortion characteristics 32 of the image data channel 40 transformed the regions 80a, 80b by scaling them such that each region now occupies 35 pixels in the X direction and 25 pixels in the Y direction. In addition, assume that the effect of other transformations such as color mapping, downsampling, smoothing, and compression resulted in each received region 150a, 150b having a number of subregions of different colors. As discussed heretofore, the transformations performed by the image data channel 40 are determined through analysis of the transformations made to the known tuning pattern 86 during transmission over the channel 40.

To determine the recovered color channel value of each of a set of recovered color channel values 152 represented by the regions 150a, 150b, in the preferred embodiment the RGB color values of each pixel within the individual region 150a, 150b are averaged together. Alternate embodiments may use different algorithms known in the art to calculate the recovered color channel values. The averaging results in an averaged RGB color value of (22,68,189) for exemplary region 150a, and an averaged RGB color value of (43,96, 217) for exemplary region 150b.

The recovered channel values 152 are converted into corresponding 5-bit blocks of recovered binary data 154 according to the formula (with the result rounded to the nearest integer):

Block Value=(Recovered Channel Value−MinColorVal)/MinColorChg

Figure 10:
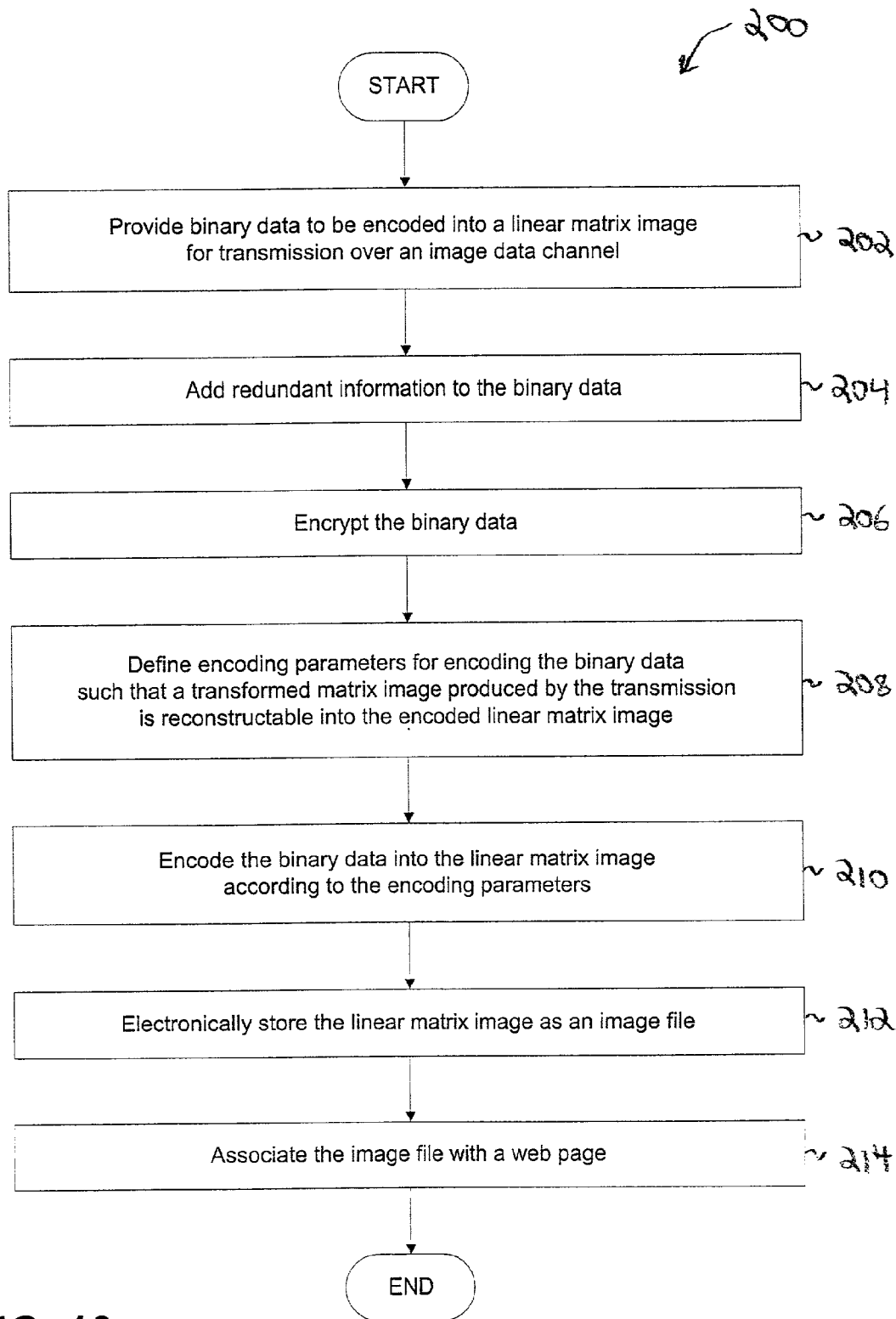
FIG. 10 is a top-level flowchart of an embodiment of the encoding of a linear matrix according to the present invention.

Another embodiment of the present invention, as best understood with reference to FIG. 10, is a method 200 of encoding binary data 2 for transmission over an image data channel 40. At 202, binary data 2 to be encoded into a linear matrix image 4 for transmission over an image data channel 40 is provided. At 204, in some embodiments, redundant information is added to the binary data 2. The purpose of the redundant information is to allow error correction and detection to be performed on the received data section 6b after transmission over the image data channel 40, and the redundant information is provided according to a conventional error correction and detection algorithm. At 206, in some embodiments, the binary data is encrypted for security purposes according to a conventional encryption algorithm. At 208, encoding parameters 30 for encoding the binary data 2 (after any addition 204 of redundant data and/or encryption 206) are defined such that a transformed matrix image 6 produced by the transmission is reconstructable into the encoded linear matrix image 4. At 210, the binary data 2 (again, after optional addition 204 and/or encryption 206) is encoded into the linear matrix image 4 according to the encoding parameters 30. At 212, the encoded linear matrix image 4 is electronically stored as an image file. At 214, the image file is associated with a web page 36, and the method 200 concludes.

Figure 11:
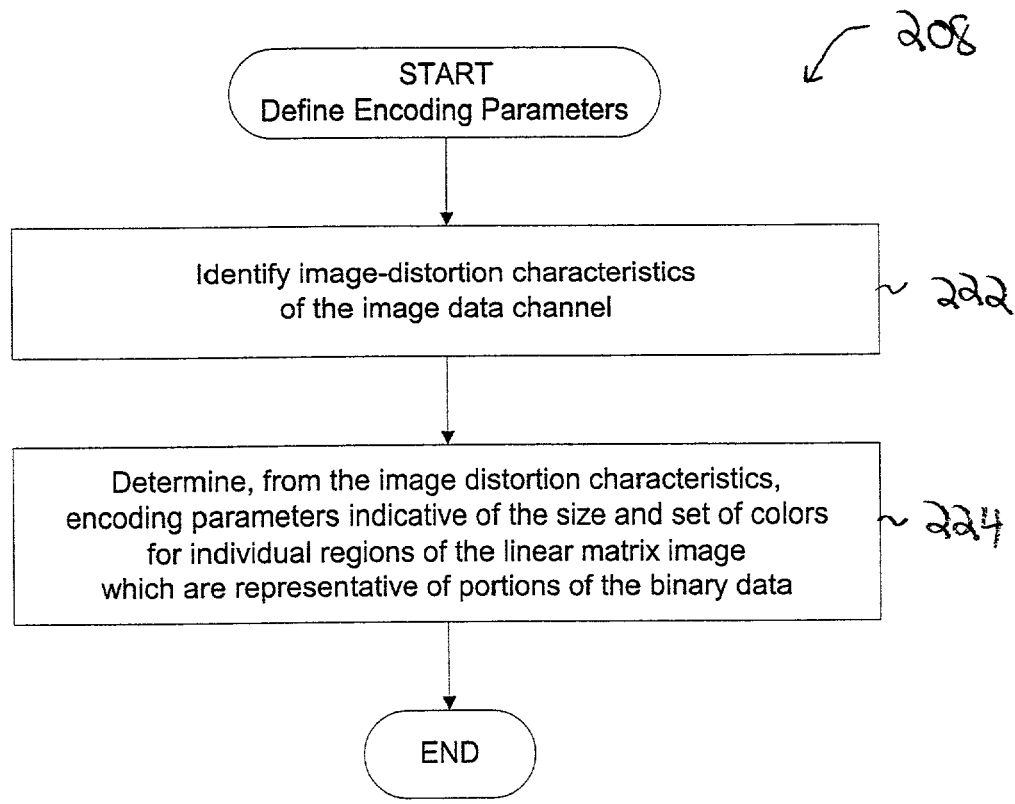
FIG. 11 is a more detailed flowchart of the defining encoding parameters of FIG. 10.

Considering now in further detail the defining 208 of the encoding parameters 30, and with reference to FIG. 11, at 222 image-distortion characteristics 32 of the image data channel 40 are identified. At 224, encoding parameters 30 indicative of the size and set of colors for individual regions 80 of the linear matrix image 4 which are representative of portions of the binary data 2 are determined from the image distortion characteristics 32. Then the defining 208 concludes.

Figure 12:
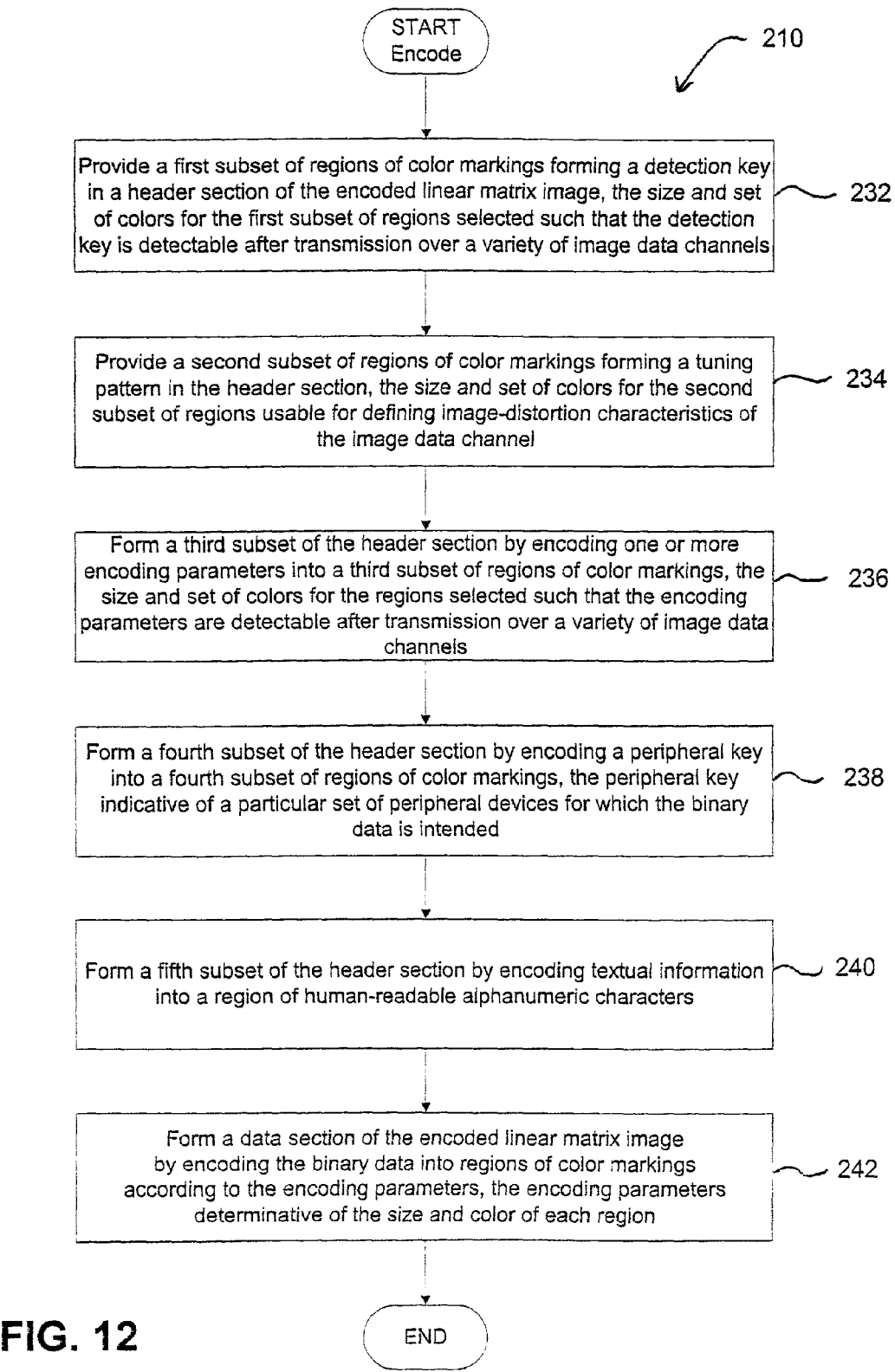
FIG. 12 is a more detailed flowchart of the encoding binary data into the linear matrix image of FIG. 10.

Considering now in further detail the encoding 210 of the binary data, and with reference to FIG. 12, at 232 a first subset of regions 82 of color markings forming a detection key 84 in a header section 4a of the encoded linear matrix image 4 is provided, the size and set of colors for the first subset of regions selected such that the detection key 84 is detectable after transmission over a variety of image data channels 40. At 234, a second subset of regions 82 of color markings forming a tuning pattern 86 in the header section 4a is provided, the size and set of colors for the second subset of regions usable for defining image-distortion characteristics 32 of the image data channel 40. At 236, a third subset of the header section 4a is formed by encoding one or more encoding parameters 30 into an encoding parameter images 88 subset of regions 82 of color markings, the size and set of colors for the regions selected such that the encoding parameters 30 are recoverable after transmission over a variety of image data channels 40. At 238, a fourth subset of the header section 4a is formed by encoding a peripheral key 92 into a fourth subset of regions 82 of color markings, the peripheral key 92 indicative of a particular set of peripheral devices 130 for which the binary data 2 is intended. At 240, a fifth subset of the header section 4a is formed by encoding textual information into a region of human-readable alphanumeric characters 90. At 242, a data section 4b of the encoded linear matrix image 4 is formed by encoding the binary data 2 (including any addition 204 of redundant data and/or encryption 206) into regions 80 of color markings according to the encoding parameters 30. The encoding parameters 30 determine the size and color of each region 80 in the data section 4b. Then the encoding 210 concludes.

Figure 13:
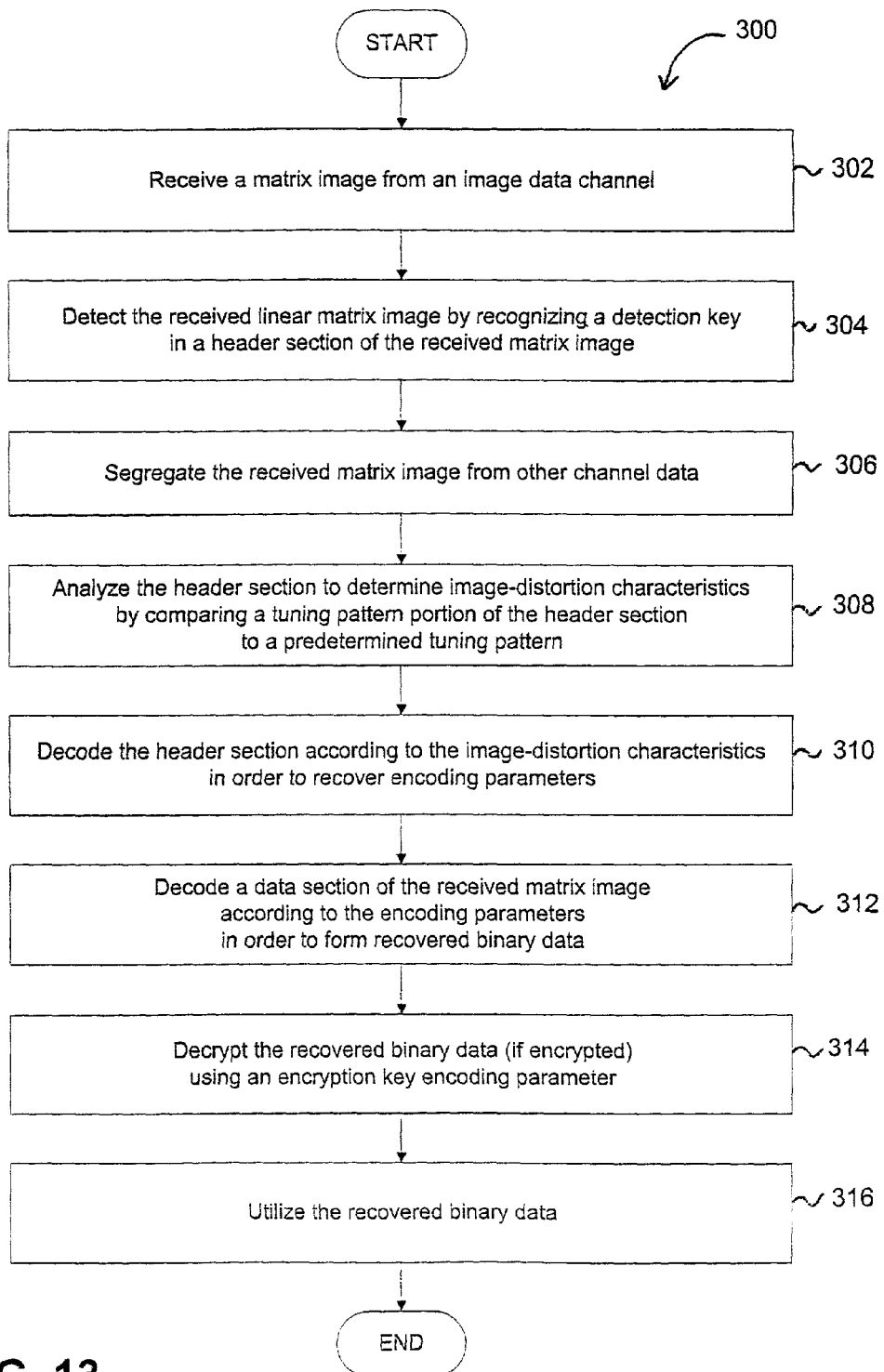
FIG. 13 is a top-level flowchart of an embodiment of the recovery of binary data from a received linear matrix according to the present invention.

A further embodiment of the present invention, as best understood with reference to FIG. 13, is a method 300 of recovering binary data 2 encoded in an linear matrix image 4 that is received over an image data channel as a received linear matrix image 6. At 302, the received matrix image 6 is received from an image data channel 40. At 304, the received linear matrix image 6 is detected by recognizing a detection key 84 in a header section 6a of the received matrix image 6. At 306, the received matrix image 6 is segregated from other data received from the image data channel 40. At 308, the header section 6a is analyzed to determine image-distortion characteristics 32 of the image data channel 40 by comparing a tuning pattern portion 86 of the header section 6a to a known tuning pattern. At 310, the header section 6a is decoded according to the image-distortion characteristics 32 in order to recover encoding parameters 30. At 312, a data section 6b of the received matrix image 6 is decoded according to the encoding parameters 30 in order to form recovered binary data 8. If the binary data 2 in the encoded linear matrix image 4 had been encrypted prior to transmission over the image data channel 40, then at 314 the recovered binary data 8 is decrypted using an encryption key included as one of the encoding parameters 30. At 316, the recovered binary data 2 is utilized. Then the method 300 concludes.

From the foregoing it will be appreciated that the system and methods provided by the present invention represent a significant advance in the art. Although several specific embodiments of the invention have been described and illustrated, the invention is not limited to the specific methods, forms, or arrangements of parts so described and illustrated. The invention is limited only by the claims.

What is claimed is:

1. A method of encoding binary data for transmission over an image data channel, comprising:
defining encoding parameters adapted for encoding the binary data in such a manner that a transformed linear matrix image produced by transmitting an encoded linear matrix image over the image data channel is reconstructable into the encoded linear matrix image; and
encoding the binary data into the encoded linear matrix image according to the encoding parameters, the encoded linear matrix image including at least one of the encoding parameters.

2. The method of claim 1, further comprising:
electronically storing the encoded linear matrix image as an image file.

3. The method of claim 2, further comprising:
associating the image file with a web page.

4. The method of claim 1, further comprising:
encrypting the binary data prior to the encoding.

5. The method of claim 1, further comprising:
identifying image-distortion characteristics of the image data channel; and wherein the defining includes analyzing the image-distortion characteristics so as to determine the encoding parameters.

6. The method of claim 1, wherein the binary data represents a firmware upgrade for a printing apparatus.

7. The method of claim 1, wherein the encoded linear matrix image includes all of the encoding parameters.

8. A method of encoding binary data for transmission over an image data channel, comprising:
defining encoding parameters adapted for encoding the binary data in such a manner that a transformed linear matrix image produced by transmitting an encoded linear matrix image over the image data channel is reconstructable into the encoded linear matrix image; and encoding the binary data into the encoded linear matrix image according to the encoding parameters, the encoded linear matrix image including at least one of the encoding parameters, wherein the encoding further includes encoding a data section of the encoded linear matrix image, the data section having a plurality of regions of colored data markings, each of the data marking regions representative of a predetermined quantity of the binary data.

9. The method of claim 8, wherein each individual one of the plurality of data marking regions has a predetermined size and one of a set of predetermined colors.

10. The method of claim 9, further comprising:
identifying image-distortion characteristics of the image data channel; and
determining the predetermined size and the set of predetermined colors from the image-distortion characteristics.

11. The method of claim 10, wherein the predetermined amount of the binary data encoded in each color marking region corresponds to the number of different predetermined colors in the set.

12. The method of claim 10, wherein the image-distortion characteristics are obtained from a particular image data channel with which the encoded linear matrix image is associated.

13. The method of claim 10, wherein the image-distortion characteristics include one or more characteristics selected from the group consisting of dimensional scaling, color mapping, downsampling, clipping, pagination, margination, smoothing, compression, and printer control language encapsulation.

14. The method of claim 9, wherein the numeric value of the predetermined quantity of the binary data represented by a selected individual one of the plurality of data marking regions corresponds to the particular one of the predetermined colors used for the selected data marking region.

15. The method of claim 8, wherein the encoding further includes encoding a header section of the encoded linear matrix image, the header section having a plurality of regions of colored header markings, a subset of the header marking regions indicative of at least one encoding parameter used for encoding the data section.

16. The method of claim 15, wherein the header section further includes another subset of the header marking regions indicative of a detection key for recognizing the transformed linear matrix image.

17. The method of claim 15, wherein the header section further includes another subset of the header marking regions indicative of a tuning pattern usable for defining image-distortion characteristics.

18. A method of encoding binary data for transmission over an image data channel, comprising:
encoding the binary data into a linear matrix image having image attributes which ensure that a transformed linear matrix image produced after the transmission over the image data channel is decodable using at least one encoding parameter included in the linear matrix image so as to reconstruct the binary data from the transformed linear matrix image; and
electronically storing the linear matrix image as an image file.

19. A method of encoding binary data for transmission over an image data channel, comprising:
identifying image-distortion characteristics of the image data channel;
analyzing the image-distortion characteristics so as to define attributes of an encoded linear matrix image, the attributes defined such that a transformed linear matrix image formed by distorting the encoded linear matrix image according to the image-distortion characteristics is reconstructable into the linear matrix image; and
encoding the binary data into the encoded linear matrix image having the attributes.

20. A method of recovering binary data encoded in an encoded linear matrix image from a received linear matrix image received over an image data channel, comprising:
analyzing a header section of the received linear matrix image to determine image-distortion characteristics of the image data channel;
decoding the header section according to the image-distortion characteristics so as to recover at least one encoding parameter, the at least one encoding parameter previously used to encode the binary data; and
decoding a data section of the received linear matrix image according to the at least one encoding parameter so as to form recovered binary data.

21. The method of claim 20, further comprising:
recognizing a detection key in the header section.

22. The method of claim 20, wherein the analyzing further comprises:
comparing a tuning pattern portion of the header section to a predetermined tuning pattern to determine the image-distortion characteristics.

23. The method of claim 20, further comprising:
utilizing the recovered binary data.

24. The method of claim 23, wherein the binary data includes a firmware upgrade for a printing apparatus, and wherein the utilizing further comprises installing the firmware upgrade in the printing apparatus.

25. The method of claim 20, further comprising:
segregating the received linear matrix image from other channel data received from the image data channel.

26. The method of claim 20, wherein the at least one encoding parameter is selected from the group consisting of a number of color channels, a safe image width, a safe image height, a minimum X block size, a minimum Y block size, a minimum color offset, a minimum color value, and a maximum color value.

27. The method of claim 20, wherein the binary data encoded in the encoded linear matrix image is encrypted and wherein the at least one encoding parameter includes an encryption key, further comprising:
decrypting the recovered binary data using the encryption key.

28. A method of sending binary data over an image data channel, comprising:
encoding the binary data into an encoded linear matrix image;
transmitting the encoded linear matrix image over the image data channel including distorting the encoded linear matrix image to form a transformed linear matrix image, wherein the distorting includes rendering the encoded linear matrix image with a web browser to form a partially-transformed linear matrix image; and
decoding the received linear matrix image to recover the binary data including decoding the transformed linear matrix image.

29. The method of claim 28, wherein the rendering forms a partially-transformed linear matrix image, the distorting further including:
sending the partially-transformed linear matrix image through a print channel to form the transformed linear matrix image.

30. An encoded linear matrix image representative of binary data, comprising:
a predetermined detection key recognizable in a transformed detection key portion of a transformed linear matrix image produced by transmitting the encoded linear matrix image over an image data channel, the encoded detection key adapted to delineate the transformed linear matrix image from other channel data;
a predetermined tuning pattern proximate the detection key, the predetermined tuning pattern comparable to a transformed tuning pattern portion of the transformed linear matrix image so as to define image-distortion characteristics of the channel;
at least one encoding parameter proximate the predetermined tuning pattern, a transformed encoding parameter image portion of the transformed linear matrix image processable according to the image-distortion characteristics so as to recover at least one corresponding encoding parameter; and
a data section representative of the binary data proximate the at least one encoding parameter, a transformed data section of the transformed linear matrix image processable according to the at least one encoding parameter and the image-distortion characteristics so as to recover the binary data.

31. The method of claim 30, wherein each of the predetermined detection key, the predetermined tuning pattern, the at least one encoding parameter image, and the data section includes a plurality of regions of color markings, each individual one of the plurality of regions having a predetermined size and one of a set of predetermined colors.

32. The method of claim 31, wherein each individual one of the plurality of regions in the data section has a color representative of a predetermined quantity of the binary data.

33. The method of claim 31, wherein the predetermined detection key, the predetermined tuning pattern, and the at least one encoding parameter image are separated from each other in the encoded linear image by white space.

34. The method of claim 31, wherein the predetermined size varies among individual ones of the plurality of regions in the predetermined tuning pattern.

35. A computer-readable medium having processor-executable instructions therein which, when executed by a processor, cause the processor to:
define encoding parameters adapted for encoding the binary data in such a manner that a transformed linear matrix image produced by transmitting an encoded linear matrix image over an image data channel is reconstructable into the encoded linear matrix image; and
encode the binary data into the encoded linear matrix image according to the encoding parameters, the encoded linear matrix image including at least one of the encoding parameters.

36. A computer-readable medium having processor-executable instructions therein which, when executed by a processor, cause the processor to:
analyze a header section of a received linear matrix image to determine image-distortion characteristics of an image data channel;
decode the header section according to the image-distortion characteristics so as to recover at least one encoding parameter, the at least one encoding parameter previously used to encode the binary data; and
decode a data section of the received linear matrix image according to the at least one encoding parameter so as to form recovered binary data.

37. A method for encoding binary data for transmission over an image data channel, comprising:
a step for defining encoding parameters adapted for encoding the binary data in such a manner that a transformed linear matrix image produced by transmitting an encoded linear matrix image over the image data channel is reconstructable into the encoded linear matrix image; and
a step for encoding the binary data into the encoded linear matrix image according to the encoding parameters, the encoded linear matrix image including at least one of the encoding parameters.

38. A method for recovering binary data encoded in an encoded matrix image from a received matrix image received over an image data channel, comprising:
a step for analyzing a header section of the received matrix image to determine image-distortion characteristics of the image data channel;
a step for decoding the header section according to the image-distortion characteristics so as to recover at least one encoding parameter, the at least one encoding parameter previously used to encode the binary data; and
a step for decoding a data section of the received matrix image according to the at least one encoding parameter so as to form recovered binary data.

39. An apparatus for encoding binary data for transmission over an image data channel, comprising:
defining means for defining encoding parameters adapted for encoding the binary data in such a manner that a transformed matrix image produced by transmitting an encoded linear matrix image is reconstructable into the encoded linear matrix image; and
encoding means for encoding the binary data into the encoded linear matrix image according to the encoding parameters, the encoded linear matrix image including at least one of the encoding parameters.

40. An apparatus for recovering binary data encoded in an encoded matrix image from a received matrix image received over an image data channel, comprising:
decoder tuning means for analyzing a header section of the received matrix image to determine image-distortion characteristics of the image data channel;
encoding parameter reconstructing means for decoding the header section according to the image-distortion characteristics so as to recover at least one encoding parameter, the at least one encoding parameter previously used to encode the binary data; and
data-decoding means for decoding a data section of the received matrix image according to the at least one encoding parameter so as to form recovered binary data.

41. An apparatus for encoding binary data for transmission over an image data channel, comprising:
a distortion compensator which defines encoding parameters adapted for encoding the binary data in such a manner that a transformed matrix image produced by transmitting an encoded linear matrix image is reconstructable into the encoded linear matrix image; and a linear matrix encoder communicatively coupled to the distortion compensator which encodes the binary data into the encoded linear matrix image according to the encoding parameters, the encoded linear matrix image including the encoding parameters.

42. An apparatus for recovering binary data encoded in an encoded matrix image from a received matrix image received over an image data channel, comprising:

a decode tuner communicatively coupled to the image data channel which analyzes a header section of the received matrix image to determine image-distortion characteristics of the image data channel;

an encoding parameter reconstructor communicatively coupled to the decoder tuner which decodes a header section according to the image-distortion characteristics so as to recover at least one encoding parameter, the at least one encoding parameter previously used to encode the binary data; and a data decoder communicatively coupled to the encoding parameter reconstructor which decodes a data section of the received matrix image according to the at least one encoding parameter so as to form recovered binary data.

* * * * *

UNITED STATES PATENT AND TRADEMARK OFFICE
CERTIFICATE OF CORRECTION

PATENT NO. : 7,088,463 B2
APPLICATION NO. : 09/982142
DATED : August 8, 2006
INVENTOR(S) : David Marshall Holcomb Page 1 of 1

It is certified that error appears in the above-identified patent and that said Letters Patent is hereby corrected as shown below:

In column 15, line 20, in Claim 30, after "parameter" insert -- image --.

In column 18, line 2, in Claim 42, after "decodes" delete "a" and insert -- the --, therefor.

Signed and Sealed this

Second Day of June, 2009

JOHN DOLL
*Acting Director of the United States Patent and Trademark Office*